United States Patent [19]

Barone et al.

[11] Patent Number: 4,754,956

[45] Date of Patent: Jul. 5, 1988

[54] SUPPORT FOR THE ELASTIC SUSPENSION OF THE ENGINE IN A MOTOR-CAR WITH RESPECT TO THE CHASSIS OF THE SAME

[75] Inventors: Gennaro Barone, Milan; Giovanni Vanessi, Sesto S. Giovanni, both of Italy

[73] Assignee: S.A.G.A. - Societa' Applicazioni Gomma Antivibranti S.p.A., Italy

[21] Appl. No.: 892,055

[22] Filed: Aug. 1, 1986

[30] Foreign Application Priority Data

Sep. 18, 1985 [IT] Italy .................. 22192 A/85

[51] Int. Cl.$^4$ .................. F16F 13/00; F16F 9/34
[52] U.S. Cl. .................. 267/140.1; 137/625.32; 180/312; 248/562; 267/219; 280/714
[58] Field of Search .................. 267/140.1, 8 R, 127; 188/319, 299; 180/902, 300, 312; 280/714; 248/562, 636; 137/625.32

[56] References Cited

U.S. PATENT DOCUMENTS

| | | | |
|---|---|---|---|
| 1,208,709 | 12/1916 | La Rue | 137/625.32 X |
| 2,421,585 | 6/1947 | Thiry | 267/140.1 |
| 2,457,749 | 12/1948 | Thiry | 267/140.1 |
| 3,827,538 | 8/1974 | Morgan | 188/299 X |
| 4,420,060 | 12/1983 | Kakimoto | 267/140.1 X |
| 4,583,503 | 4/1986 | Kumagai et al. | 248/636 X |
| 4,583,723 | 4/1986 | Ozawa | 267/140.1 |
| 4,610,438 | 9/1986 | Eberhard et al. | 248/562 X |
| 4,621,795 | 11/1986 | Eberhard et al. | 188/378 X |
| 4,630,808 | 12/1986 | Ushijima et al. | 262/140.1 |

FOREIGN PATENT DOCUMENTS

| | | | |
|---|---|---|---|
| 0155646 | 9/1985 | European Pat. Off. . | |
| 163817 | 12/1985 | European Pat. Off. | 262/140.1 |
| 0173273 | 3/1986 | European Pat. Off. . | |
| 1247880 | 8/1967 | Fed. Rep. of Germany | 188/299 |
| 3312529 | 10/1983 | Fed. Rep. of Germany . | |
| 3316025 | 11/1984 | Fed. Rep. of Germany . | |
| 2524951 | 10/1983 | France | 267/140.1 |
| 2547378 | 12/1984 | France . | |
| 59-93537 | 5/1984 | Japan . | |
| 151637 | 8/1984 | Japan | 267/140.1 |
| 98237 | 6/1985 | Japan | 267/140.1 |
| 60-155027 | 8/1985 | Japan . | |
| 25918 | of 1910 | United Kingdom | 188/319 |
| 213191 | 3/1924 | United Kingdom | 188/319 |
| 2119474 | 11/1983 | United Kingdom . | |
| 2135795A | 9/1984 | United Kingdom . | |
| 2137308 | 10/1984 | United Kingdom . | |
| 2150258 | 6/1985 | United Kingdom . | |

Primary Examiner—George E. A. Halvosa
Attorney, Agent, or Firm—Stevens, Davis, Miller & Mosher

[57] ABSTRACT

A vibration isolation mount for elastic suspension of an automobile engine having a body containing a dampening liquid controlled so as to maximize the dampening of low frequency oscillations having a high amplitude and to minimize high frequency oscillations having a small amplitude. The flow of dampening liquid between two chambers is controlled by a pair of bell-shaped elements nested together to form a conduit therebetween. The bell-shaped elements can be rotated with respect to each other, preferably by an electric motor, to open and close perforations in the bell-shaped elements.

5 Claims, 4 Drawing Sheets

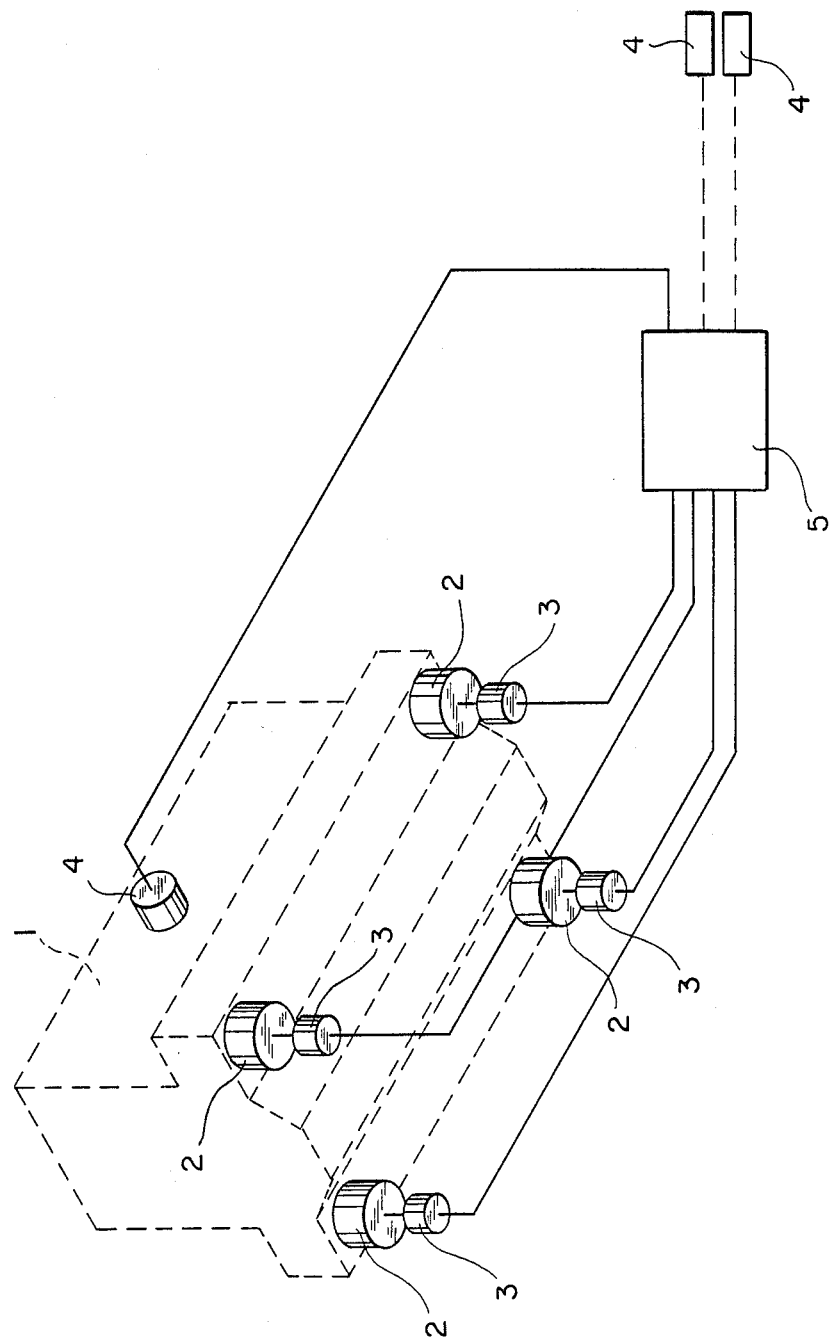

SUPPORT FOR THE ELASTIC SUSPENSION OF THE ENGINE IN A MOTOR-CAR WITH RESPECT TO THE CHASSIS OF THE SAME

SUMMARY

A support for the suspension of an engine relative to a car chassis, provided with means for varying the dampening of the oscillations—between engine and chassis, in such a way as to render maximum the dampening of the low frequency oscillations having a high amplitude, and to minimize the high frequency oscillations having a small amplitude.

These means determine the variation of the aperture—for the drawing of a liquid, between two chambers, and/or the variation at play, between a disc and the shaft to which the disc is connected.

The cited means are controlled by levers and/or by actuators that are connected to sensors.

DESCRIPTION

The present invention refers to a support for the elastic suspension of a vehicle engine with respect to the chassis of the vehicle itself.

The support substantially comprises a mounting—which is adapted to be fixed to the chassis, an elastically deformable element—connected to the mounting itself, and adapted to be fixed to the engine, and a liquid damping device that is predisposed for damping the shiftings of the above-said deformable elements.

The damping devices, which are provided with the supports of the previously mentioned type, usually comprise a pair of chambers for the fluid, that are connected one to the other through a drawing-conduit; when the elastically deformable element undergoes a deformation—following the load variation that acts upon itself, the said fluid passes—from one to the other of the two above-indicated chambers and, owing to the resistance that it encounters, in passing through the drawing-conduit, it encounters a damping action, which tends to contrast shifting of the deformable element.

In construction of the suspension of a vehicle engine—with respect to the chassis, there is normally utilized at least one elastic support—of the previously-mentioned type; the following drawback is frequently found:

The behavior of the suspension is not satisfactory—for all the vibration frequencies with which the engine moves during normal running conditions of the vehicle, nor during the various load conditions of the vehicle itself.

In fact, the damping of the previously-mentioned elastic elements—that comprise one of the characteristics of the element itself, and that hence, can be varied during the running of the vehicle, derives from a solution of compromise between two opposite existing needs.

In fact, for suitably damping low frequency vibrations, a considerable damping is required; whereas—whenever very high frequency vibrations are had, it is necessary to have a lesser damping if one wishes to avoid generating too rigid a system and which hence, gives rise to an excessive noisiness during the running of the vehicle.

For these reasons, in the normally used devices, insufficient dampings are encountered for low frequencies, and excessive noisiness for high frequency vibrations.

An objective of this invention is to realize a support for the elastic suspension of a vehicle engine, with respect to its chassis, thanks to which the previously mentioned drawback is eliminated—and through which hence, there can be obtained a satisfactory state of damping and noise—under any running conditions for the vehicle.

Hence, another objective of the present invention is to realize elastic supports provided with fluid damping devices wherein the damping can be varied as desired and defined, at every instant, with a prefixed value.

These aims are achieved through the means of a support for the elastic suspension of an automobile engine with respect to the chassis of the automobile itself, realized through a frame that is adopted to be fixed to the said chassis, an elastically deformable element constructed with an elastic material, connected to said frame and adopted to be fixed to said engine and a liquid damping device for damping the shifting of said elastically deformable element, characterized by the fact that it comprises means for varying the damping effect of said damping devices.

What forms another object of the present invention, is a system for the elastic suspension of an automobile engine—with respect to the chassis of the vehicle itself, realized through the means of at least one elastic support comprising substantially a frame adopted to be fixed to said chassis, an elastically deformable element, constructed out of an elastic material, connected to said frame and adopted to be fixed to said engine, and a liquid damping device for damping the shiftings of said elastically deformable element, characterized by the fact that it comprises means for varying the damping of said damping device, electrically actionable actuators for controlling said means in such a way as to define every damping device with a prefixed damping value, at least one sensor for taking a parameter representative of the running condition of the vehicle and for generating a corresponding electrical signal, and an electronic plant for elaborating said electric signals and for generating corresponding signals for controlling the said actuators.

For having a better comprehension of the system of the invention, there will now be given, solely by way of non-limiting example, a more detailed description of the same, with referring to the attached drawings, whereby:

FIG. 7 is a circuit diagram for a plurality of supports.

Figure 1:
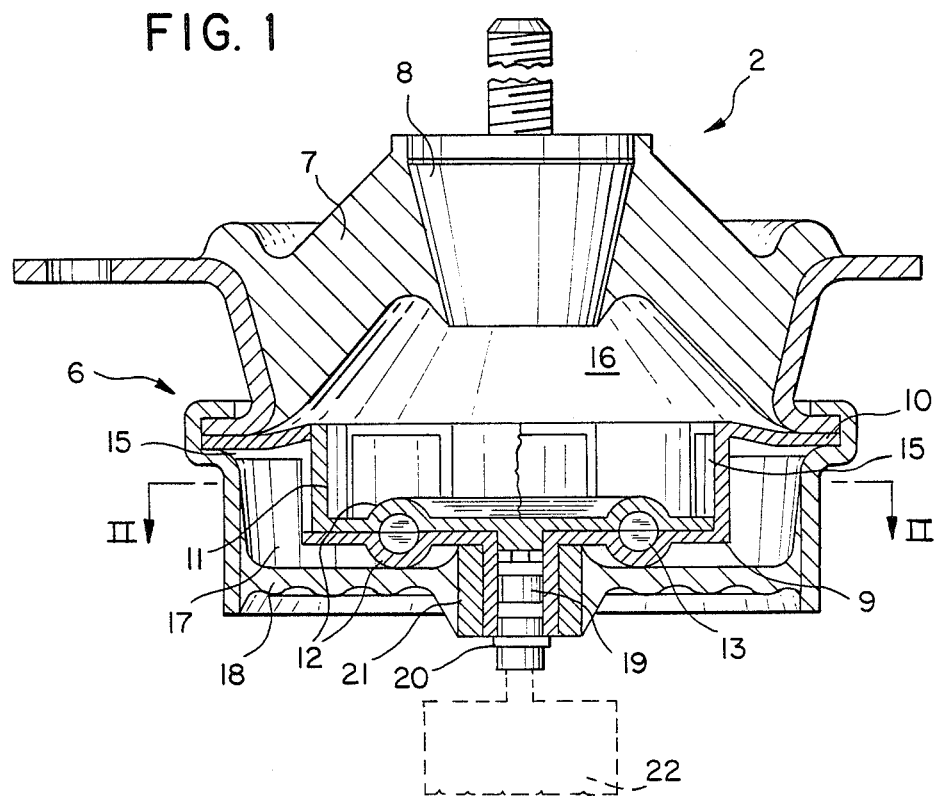
FIG. 1 shows an axial section of an elastic support, according to the invention.

With reference, first and foremost, to FIG. 1—the support 2 of the invention is for the elastic suspension of an engine 1 (FIG. 7) of an automobile, with respect to the chassis (not shown) of the automobile itself; said support being interposed between the engine and the chassis.

The elastic support 2—of which diverse embodiments are shown in the FIGS. from 1 to 6, substantially comprises a frame 6—for example, of an annular form, and an elastically deformable element 7—conveniently of an annular form, connected to the frame itself and apt for being fixed through the means of a shaft 8, and in any whatsoever convenient manner, to the car chassis.

The material of the deformable element 7, can be any elastically deformable material, rubber or an elastomer for convenience sake.

Figure 2:
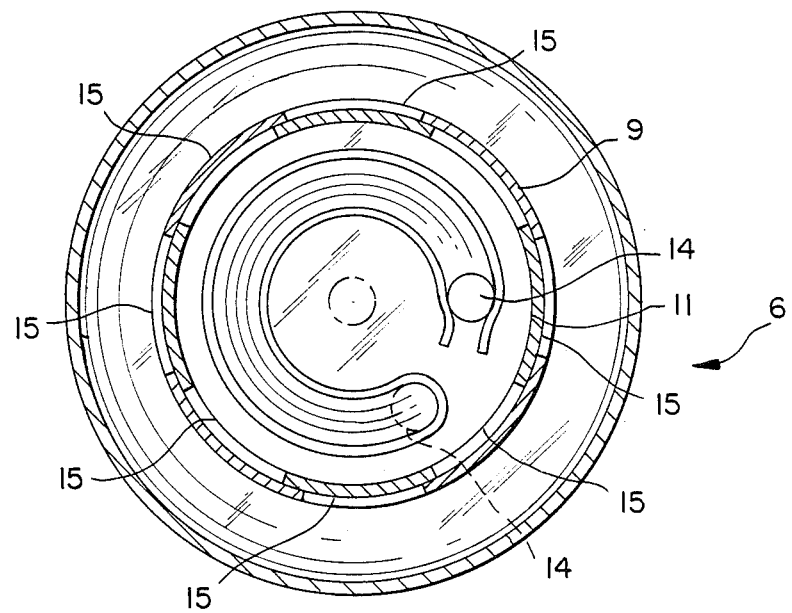
FIG. 2 shows a transverse section of the support of FIG. 1, along line II—II.

The elastic support 2 of the form of embodiment in FIG. 2, substantially comprises a first bell-shaped element 9—provided with an annular edge 10 fixed to the frame 6, and a second bell-shaped element 11—disposed inside the previous one, as can be seen clearly in the figure.

In the bottom walls of these elements, an annular groove 12 is formed in such a way as to substantially realize an annular-shaped conduit 13—when the two bell-shaped elements are coupled (in the way seen in the figure); a pair of end-holes 14, made on the above-said elements, puts the conduit into communication with a first chamber 16—defined between the elastically deformable element 7 and the two above-said elements and with a second chamber 17—defined between these latter and a deformable membrane 18, the peripherically outer borders of which are connected to the frame 6.

Morover, on the lateral walls of the two bell-shaped elements 9 and 11, slits 15 are made—having such form and dimensions as to either allow, or to prevent the passage of fluid between the above-defined first and second chambers, through these slits, when the second bell-shaped element 11 is disposed in a prefixed angular configuration in respect of the first bell-shaped element 9: said configuration is the one shown in FIG. 2.

The second bell-shaped element 11 is rotatable with respect to the one previous and, for this purpose, it is provided with a pivot 19 that rotates inside a corresondng bush 20 fixed to the other element; said latter is connected, in its turn, to a second bush 21 fixed to the membrane 18.

The rotation of the pivot 19 and hence, of the second bell-shaped element 11, with respect to the first element 9, can be operated in various ways—such as, for example, by means of a lever, or through a motor of any whatsoever type—such as, for example, an electric motor 22.

The two chambers 16 and 17, are completely filled-up with any suitable liquid—for example, a water and glycol compound of an opportune density, with values comprised between 50 and 500 centistokes.

Figure 3:
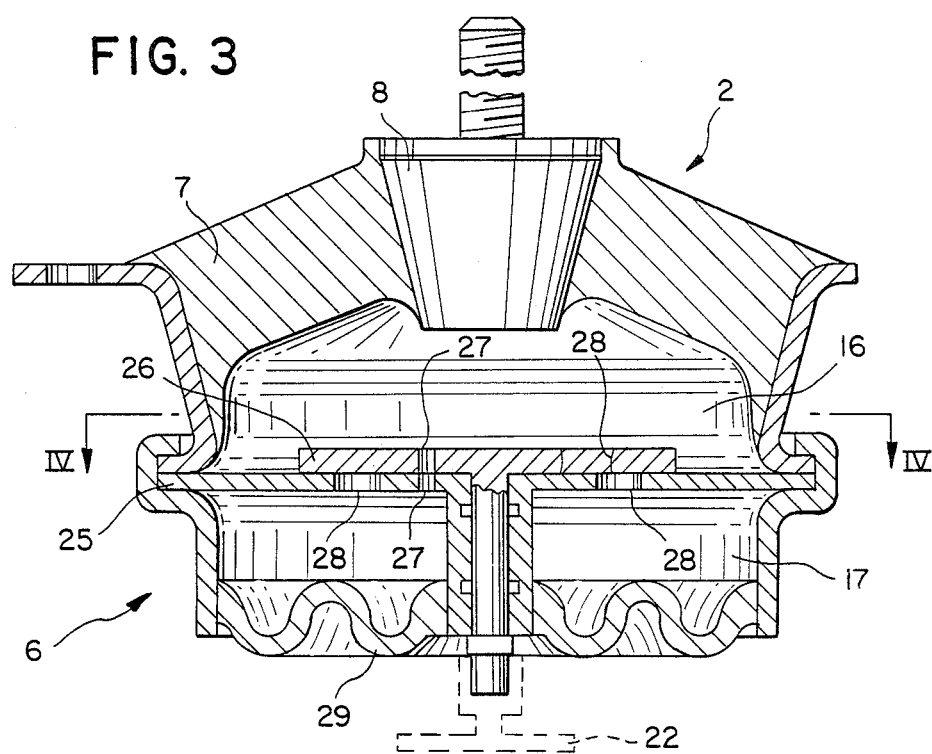
FIG. 3 shows an axial section of an elastic support of the invention, corresponding to another embodiment of the same.
Figure 4:
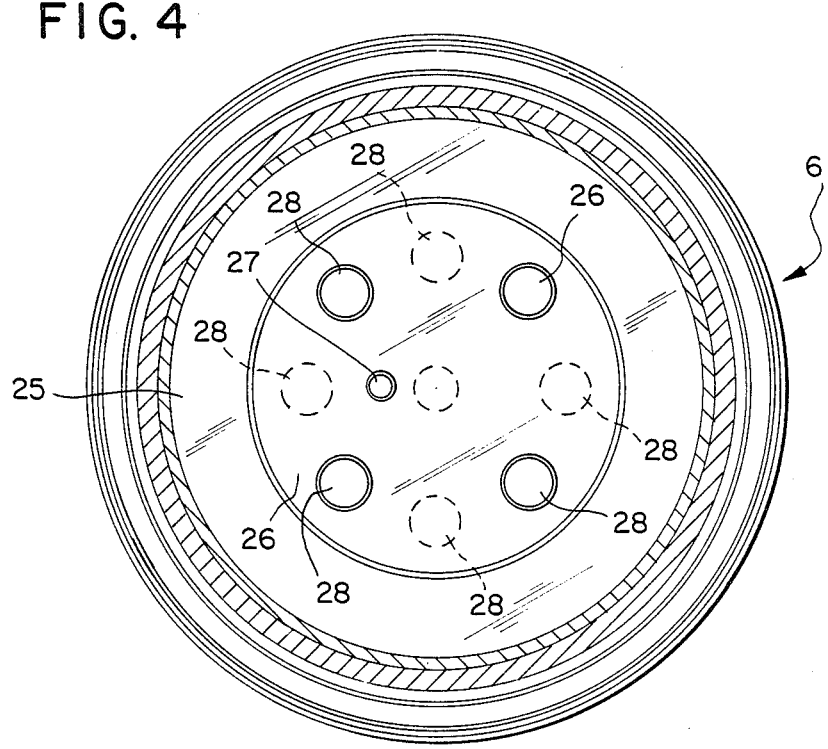
FIG. 4 shows a transverse section of the support of FIG. 3, along line IV—IV.

The elastic support 2 in the form of embodiment shown in FIGS. 3 and 4, differs from the one of the previous figures—because of the fact that the two bell-shaped elements 9 and 11 are substituted by a pair of discs—of which one is stable (indicated with 25) and fixed to the frame 6, while the other (26) is rotatable with respect to the previous one, and made solidal with a pivot operated by an electric motor 22.

A hole 27 is made in each of the two above-said discs, and these are positioned in such a way as to result coaxial for a prefixed angular configuration of the disc 26, corresponding to that shown in the FIGS. 3 and 4.

Moreover, on each of the two discs a plurality of holes 28 is made, and disposed in such a way that, in the above-said angular configuration—the holes of one disc are not overlapped by those of the other disc. However, when the discs are opportunely rotated, one disc with respect to the other, the holes of the two discs can be overlapped.

Even in this case, the complex of the two discs 25 and 26 defines, with the other elements of the elastic support, a first and a second chamber for the fluid (16 and 17 respectively). This latter, as in the previous case, is delimited by a deformable membrane 29.

The elastic supports of the forms of embodiment 5 and 6, differ from the previous ones—owing to the fact that inside each of these there is made a single chamber 32, filled with a liquid having a much greater viscosity than in the fluid used in the elastic supports of the previous form of embodiment—comprised between 50,000 and 500,000 centistokes. The latter chamber is defined between the elastically deformable element 7 and a rigid part 33, that forms part of the frame 6.

Inside said chamber, there is disposed a disc 34, which is connected to the shaft 8 by means of a connecting-rod 35; said connection takes place by means of a head 36 that acts as an abutment for the hub for the disc 34; said head 36 can assume diverse equivalent forms, among which, for example, result as being adopted for use in the device described in the GERMAN published Patent Appln. No. DE-3312529 published Oct. 20, 1983 by the same Applicant.

Said connecting-rod, in the form of embodiment of FIG. 3, is capable of assuming two diverse configurations—in the first of which (shown with a full-line in FIG. 5), an anchor made solidal with the connecting-rod 35, is attracted by an electro-magnet 38 disposed inside the shaft 8 and, in the second of which (shown with a broken-line in said figure), the connecting-rod 35 is in the downwards end-of-stroke position (from where it can be returned upwardly, through the action of a spring (not shown)).

While in the first configuration, the disc 34 results as being solidly connected to the shaft 8, in the second configuration it is free to perform axial shiftings with respect to the connecting-rod 35—and hence, inside of the chamber 32, whose wideness is substantially equal to the route for passing from the first to the second of the two previously defined configurations.

Figure 6:
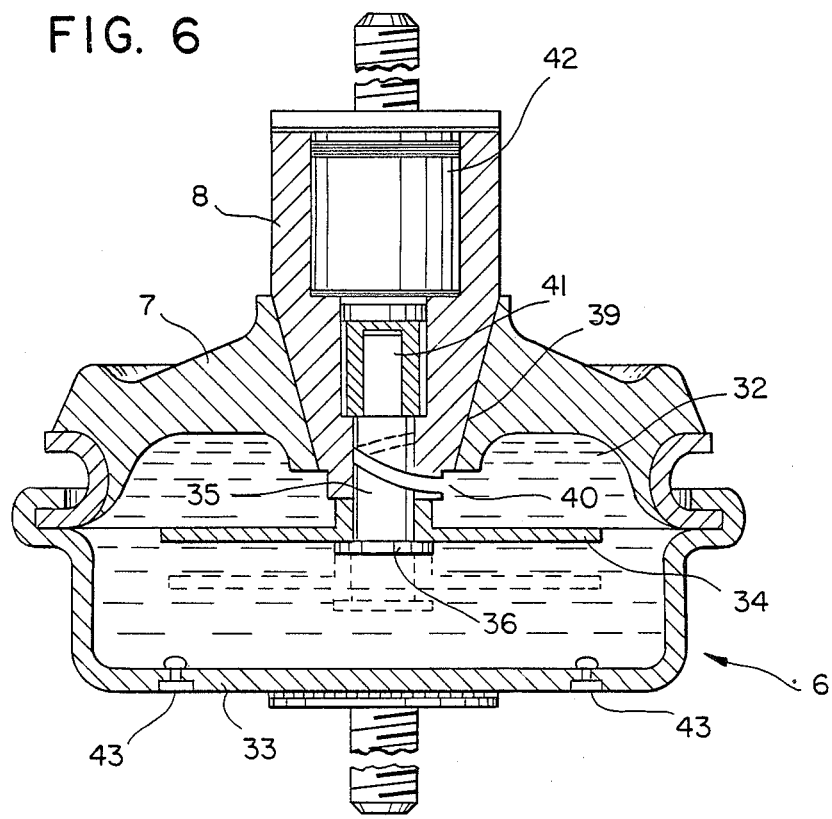

In the embodiment of FIG. 6, the connecting-rod 35 is provided with a substantially helicoidal groove 39, co-operating with a plug 40 fixed to the shaft 8; said connecting-rod is connected moreover, in any whatsoever convenient way—for example: through a coupling 41, with an electric motor 42 disposed inside the shaft 8.

With said disposition, by causing the connecting-rod 35 to rotate, the axial shifting of the head 36 of the connecting-rod itself is controlled, with respect to the shaft 8—and hence, the axial play between said head and the disc-hub 34 is regulated—for the purpose of controlling the amplitude of the vibrations of the disc itself, inside the chamber 32.

The above-said chamber can be filled-up with a fluid in any whatsoever suitable way—for example, by holes made in the wall 33, closed by opportune sealing members 43.

The functioning of each elastic support, takes place in the following manner.

In the instance of what is shown in FIGS. 1 and 2, the chambers 16 and 17, under normal functioning conditions, are filled with a fluid; when the second bell-shaped element 11 is disposed in the angular configuration with respect to the first element 9 (that has been shown in the figures), the slits 15 in the lateral parts of said elements are not overlapped, and hence, the passage of the fluid—between the chambers 16 and 17, can only take place through the holes 14 and the conduit 13.

Under these conditions a very high resistance to the passing of the fluid is created—and hence, a damping effect is had in the shiftings of the elastically deformable element 7. Instead, if the rotation of the second bell-shaped element 11 is controlled (through the electric motor 22, or in any other equal way) with respect to the first bell-shaped element, in such a way as to overlap the slits 15 of the two element to a desired extent, a further passage of having a desired section is realized between the two above-said chambers.

In this manner, there can be reduced to a prefixed extent, the damping of the shiftings of the elastically deformable element 7—till it reaches the configuration whereby the above-said slits are overlapped, and wherein there is obviously obtained the minimum resistance to the passage of the fluid—and hence, the minimum damping effect that is obtainable by the device.

A similar functioning is found in the elastic support of FIGS. 3 and 4; when the second disc 26 should be in the angular configuration with respect to the first disc 25, that was represented in the figures, wherein the two holes 27 of said discs are coaxial, the communication between the chambers 16 and 17, takes place solely through the holes themselves—which, owing to their reduced dimensions, offer a high resistance to the passage of the fluid. Therefore, in said configuration, there is had the maximum damping of the shiftings of the elastically deformable element 7.

By opportunely rotating the disc 26, through the motor 22, the damping can be controlled to the desired extent, depending upon the overlapping of the holes 28 of the two discs—till they assume the configuration whereby said holes are coaxial, wherein the minimum damping effect is had.

Figure 5:
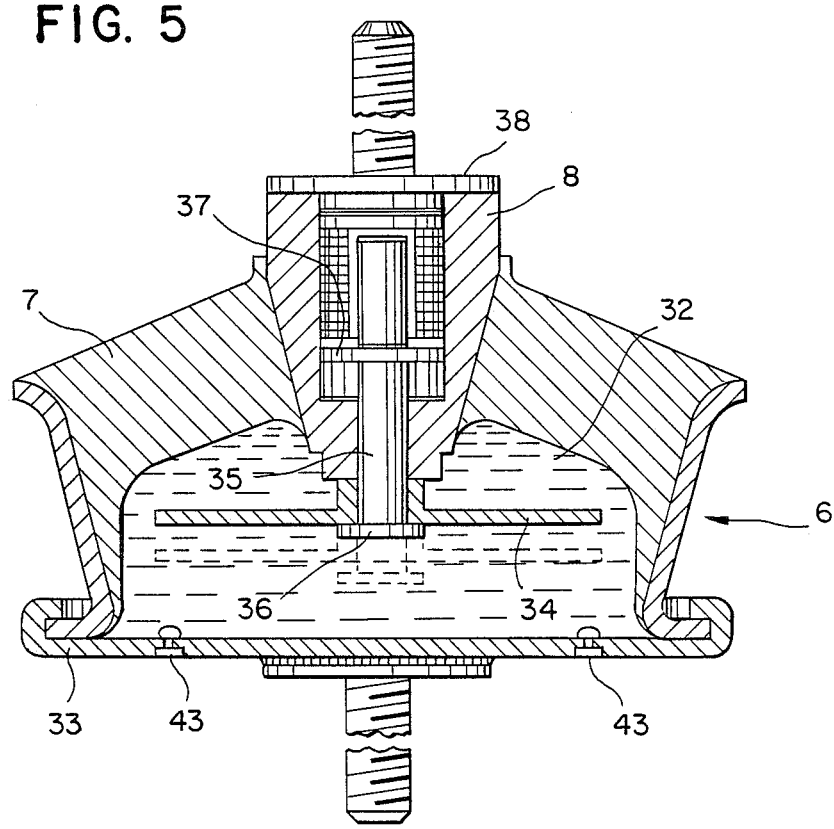
FIGS. 5 and 6 represent axial sections of elastic supports, corresponding to two further embodiments of the same.

The damping action realized with the elastic supports—of the form of embodiment in FIGS. 5 and 6, is not already obtained owing to the resistance to the drawing of the fluid—through a prefixed resistance-conduit, but through the resistance that is encountered in the shifting of the disc 34 in the direction of its axis, inside the fluid contained in the chamber 32.

In the form of embodiment in FIG. 5, the damping is maximum when, owing to the energizing of the electromagnet 38, the anchor 37 is attracted by it and hence, the connecting-rod 35 becomes disposed in its end-of-stroke position upwards, wherein the head 36 blocks the disc 34—with respect to the shaft 8.

Instead, when the electromagnet is deenergized, the head 36 takes on the configuration shown with a broken-line in the figure—and hence, the damping is lessened, since the connecting-rod 35 is free to perform oscillations of a prefixed width, with respect to the disc 34 which is immobile, having an ample surface in a high viscosity liquid.

In the support of the form of embodiment in FIG. 6, the relative axial play between disc 34 and the connecting rod 35, can be caused in a continuous way, by controlling, through the motor 42, the rotation of the connecting-rod 35, which—following said rotation, shifts axially in respect of the shaft 8—for taking the head 36 into a prefixed position.

A system will now be described—that is adopted to use the elastic suspension of a engine 1 (FIG. 7) of an automobile, comprising a support (as described previously), opportunely actuated.

In particular, in the example of FIG. 7, said system substantially comprises a plurality of elastic supports 2, each one of which is interposed in-between the engine and the chassis, a plurality of sensors 4—for sensing a parameter—showing the running condition of the vehicle, and for generating a corresponding electrical signal, and even an electronic plant 5, for receiving the above-said electrical signals for generating corresponding electrical signals for controlling the actuators 3.

The system of the invention that utilizes the already described elastic supports, functions as follows.

One or several sensors 4 can be connected to any whatsoever part of the automobile, or the engine, or to the inside of the supports themselves—for the purpose of noting the running conditions of the same; said sensors can be constituted by accelerometers, gauges for measuring the shiftings, gyrometers and such like—and hence, they are adopted to generate an electric signal, that is sent to the electronic plant 5. This latter—that can be constituted by a real and proper calculator apt for elaborating the signals themselves in any whatsoever desired manner, on the basis of a prefixed strategy generates the signals sent to the actuators 3 which—when elastic supports of the form of embodiment of FIGS. 1 and 4 are used, are constituted by electric motors 22, whereas, when the elastic supports of the other two forms of embodiment are used, are constituted by the electromagnet 38 and the electric motor 42 respectively.

The damping that is imposed through the actuators 3 in each one of the elastic supports 2 and at every instant—can be the one that is most apt for realizing an efficient suspension of the engine.

Therefore, for example, when low-frequency oscillations of the engine are had—following the elaboration of the previously mentioned signals, the actuators 3 will impose a configuration on each elastic support which is such as to realize a high damping—adopted for efficaciously opposing the shiftings of the shaft 8 and of the deformable element 7. On the contrary, when very high-frequency vibrations and of a rather reduced amplitude, are present in the engine, signals will be produced for imposing a low damping on the elastic supports 2—for the purpose of reducing the rigidness of the elastic system of the engine 1 and of the elastic supports 2—for reducing the noisiness resulting from the transmitting of the engine's vibrations to the chassis.

It results as being evident that modifications can be brought about—in the form and the disposition, to the various parts of the described elastic supports, without this being beyond the ambit of the invention. In particular, with the system that has been described, there can be utilized elastic supports having a different structure—on condition that they are provided with some sort of fluid damping device that is capable of damping the shiftings of the elastically deformable element 7 and which is provided with means that are adopted for varying the damping itself, and which are actuated by an electrically controlled actuator.

In particular, in the embodiment corresponding to the FIGS. 3 and 4, it has been found convenient to maintain the diameter of holes 28 as at least ten times greater than the diameter of the hole 27—the dimensions of the latter being in the range of values of between 2 and 6 mm to correspond to the values of viscosity of the above-cited liquid.

In the case the holes should have a form which is other than circular, the values indicated will refer to the maximum transversal dimension.

With the dimensions of the above-mentioned holes 28, there is obtained a lesser rigidity of the system—in the presence of high-frequency oscillations of a small amplitude—and with the absence substantially, of the noise phenomena being transmitted to the vehicle.

Even the solutions of FIGS. 1 and 2, are devoid of noisiness in the presence of high-frequency oscillations—through the use of wide slits 15 as is possible to realize through having recourse to the vertical walls of the two bell-shaped elements 9 and 11.

What is claimed is:

1. A vibration isolation mounting device for elastic suspension of an automobile engine comprising
    a body having means for attachment to the chassis of an automobile and an elastically deformable element with means for attachment to an engine;
    a liquid damping device for damping the movement of said elastically deformable element with means for varying the damping effect, said damping device comprising:
    first and second chambers within said body between said elastically deformable element and a first bell-shaped element and between the bell-shapd element and a deformable membrane;
    a second bell-shaped element within said body and rotatable with respect to the first bell-shaped element, each bell-shaped element having a bottom wall and a circular sidewall, said elements being nested together so that the two sidewalls are adjacent and the two bottom walls are adjacent;
    a conduit between said first and second chambers for passage of a liquid therebetween;
    said conduit being defined by at least one groove in at least one bottom wall of said bell-shaped elements with one end of said conduit opening into each chamber;
    said means for varying the damping effect comprising:
    the side walls of each said bell-shaped elements having a series of perforations for passage of damping liquid therethrough;
    said perforation being positioned to be opened and closed by the rotation of said second bell-shaped element in relation to said first bell-shaped element so that when the perforations are closed liquid moving between the first and second chambers can pass only through the length of the conduit and when opened liquid can pass between the first and second chambers by passing through the perforations.

2. The device of claim 1 including an actuator to control the rotation of said second bell-shaped element.

3. The device of claim 2 in which said actuator is an electric motor.

4. The device of claim 1 including a liquid within said chambers having a density between 50 and 500 centistokes.

5. A system for the elastic suspension of an automobile engine comprising at least one sensor for sensing a parameter of the engine operation and generating a corresponding elctrical signal;
    an electronic control means for receiving said corresponding electrical signal and for generating a second electrical signal;
    a plurality of elastic supports for said engine, at least one of said supports comprising
    a vibration isolation mounting device for elastic suspension of an automobile engine comprising
    a body having means for attachment to the chassis of an automobile and an elastically deformable element with means for attachment to an engine;
    a liquid damping device for damping the movement of said elastically deformable element with means for varying the damping effect, said damping device comprising:
    first and second chambers within said body between said elastically deformable element and a first bell-shaped element and between the bell-shaped element and a deformable membrane;
    a second bell-shaped element within said body and rotatable with respect to the first bell-shaped element, each bell-shaped element having a bottom wall and a circular sidewall, said elements being nested together so that the two sidewalls are adjacent and the two bottom walls are adjacent;
    a conduit between said first and second chambers for passage of a liquid therebetween;
    said conduit being defined by at least one groove in at least one bottom wall of said bell-shaped elements with one end of said conduit opening into each chamber;
    said means for varying the damping effect comprising:
    the side walls of each said bell-shaped elements having a series of perforations for passage of damping liquid therethrough;
    said perforation being positioned to be opened and closed by the rotation of said second bell-shaped element in relation to said first bell-shaped element so that when the perforations are closed liquid moving between the first and second chambers can pass only thrugh the length of the conduit and when opened liquid can pass between the first and second chambers by passing through the perforations;
    electrically powered actuating means to rotate said second bell-shaped element;
    means connecting said second electrical signal to said electrically powered actuating means so that the engine suspension can be varied in accordance therewith.

* * * * *